(12) United States Patent
Wulliman et al.

(10) Patent No.: US 12,263,665 B2
(45) Date of Patent: Apr. 1, 2025

(54) AEROSPACE THERMAL ACOUSTIC FIBERGLASS INSULATION USEFUL IN SUPPORTING APPLICATIONS

(71) Applicant: JOHNS MANVILLE, Denver, CO (US)

(72) Inventors: Rebecca Sue Wulliman, Centennial, CO (US); Joshua Merrell Boyce, Littleton, CO (US); Jimmy Gene Brown, Defiance, OH (US); Jayamalar Dorsey, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/994,660

(22) Filed: Nov. 28, 2022

(65) Prior Publication Data

US 2024/0173938 A1 May 30, 2024

(51) Int. Cl.
*B32B 5/26* (2006.01)
*B32B 7/022* (2019.01)
*B32B 7/12* (2006.01)
*B32B 17/02* (2006.01)
*B64C 1/40* (2006.01)
*B32B 37/12* (2006.01)
*B32B 38/00* (2006.01)

(52) U.S. Cl.
CPC ............... *B32B 5/26* (2013.01); *B32B 7/022* (2019.01); *B32B 7/12* (2013.01); *B32B 17/02* (2013.01); *B64C 1/40* (2013.01); *B32B 2037/1253* (2013.01); *B32B 37/1284* (2013.01); *B32B 2038/0076* (2013.01); *B32B 2250/03* (2013.01); *B32B 2250/20* (2013.01); *B32B 2262/101* (2013.01); *B32B 2305/72* (2013.01); *B32B 2307/102* (2013.01); *B32B 2307/304* (2013.01); *B32B 2307/3065* (2013.01); *B32B 2307/722* (2013.01); *B32B 2307/7265* (2013.01); *B32B 2605/18* (2013.01)

(58) Field of Classification Search
CPC .. B32B 5/26; B32B 7/022; B32B 7/12; B32B 17/02; B64C 1/40
See application file for complete search history.

(56) References Cited

U.S. PATENT DOCUMENTS

| | | | |
|---|---|---|---|
| 5,824,973 A | 10/1998 | Haines et al. | |
| 6,630,222 B1 | 10/2003 | Fay et al. | |
| 7,367,527 B2 | 5/2008 | Shumate et al. | |
| 7,377,084 B2 | 5/2008 | Swiszcz et al. | |
| 8,534,419 B2 | 9/2013 | Coates et al. | |
| 10,825,439 B2 | 11/2020 | Weik et al. | |
| 2003/0082414 A1* | 5/2003 | DiChiara, Jr. | B32B 19/04 428/701 |

* cited by examiner

*Primary Examiner* — Lawrence D Ferguson
(74) *Attorney, Agent, or Firm* — Robert D. Touslee

(57) ABSTRACT

An insulation component for use in an airplane, comprising a first fibrous layer having a first density and a second fibrous layer chemically bound to the first fibrous layer. The second fibrous layer has a second density less than the first density. The first and second fibrous layers comprise a similar material. The first density provides the insulation component with enough rigidity to be self-supporting. The average fiber diameter of the fibers in the first and second fibrous layers is less than 2 μm.

20 Claims, 11 Drawing Sheets

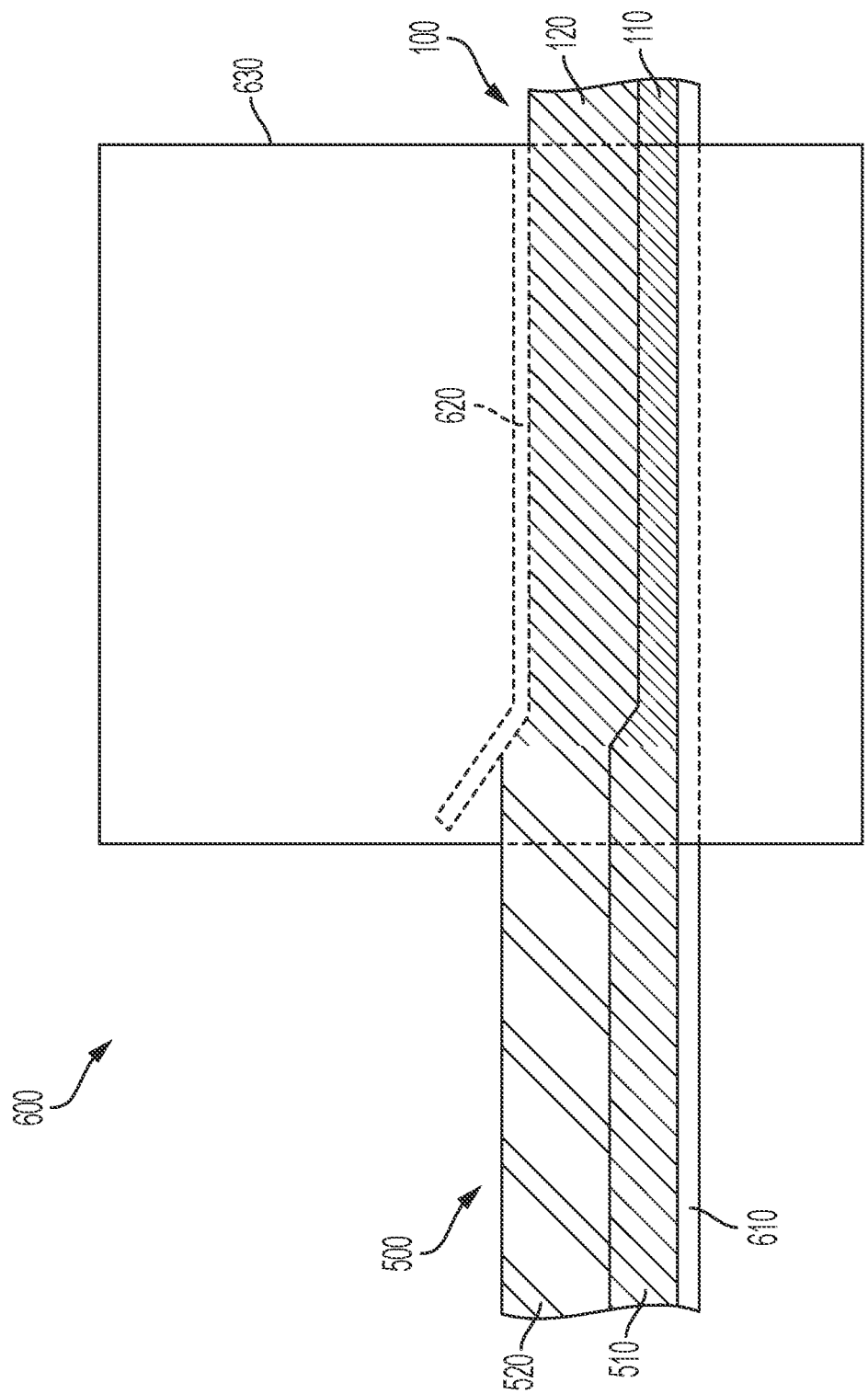

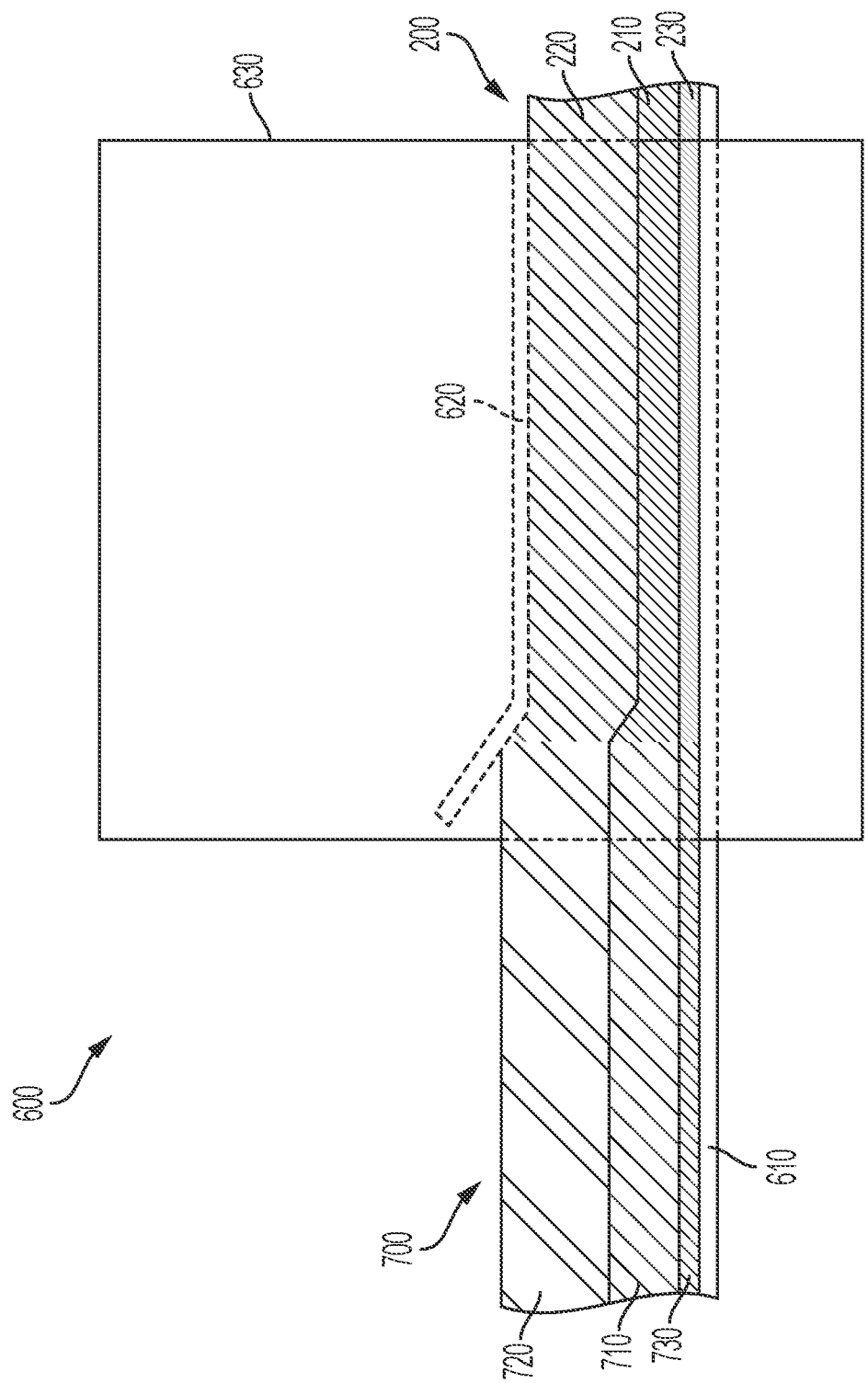

AEROSPACE THERMAL ACOUSTIC FIBERGLASS INSULATION USEFUL IN SUPPORTING APPLICATIONS

BACKGROUND

Airplanes are an increasingly common method of transportation. As airplane technologies improve, airplanes can travel faster and farther than ever before. Moreover, improvements in airplane technology have made flights cheaper and more accessible. Further, airplanes are becoming safer, thus giving people a greater confidence in using airplanes. As such, airplanes have become an important aspect of nearly all modern-day society.

One important design aspect of airplanes are the noise and temperature within the airplane. Airplanes generate tremendous amount of noise while flying given the amount of energy and propulsion required for flight as well as the surrounding air turbulence. Moreover, airplanes experience subzero temperatures at high altitudes. As such, the interiors of the airplanes may naturally be loud and cold.

One way to mitigate the amount of noise and temperature bleeding into the interior of the airplane is through insulation. For example, insulation may be applied throughout the airplane fuselage to reduce how much noise leaks into the airplane. Moreover, insulation reduces heat transfer between the interior of the airplane and the sub-zero exterior temperatures. Insulation, therefore, serves as an important part of the airplane by reducing the interior noise levels of an airplane and making the temperature more comfortable for passengers.

Accordingly, it would be beneficial for improved insulation designs, and methods of manufacturing thereof, that minimizes noise and temperature leakage within an airplane.

SUMMARY

One aspect of the disclosure provides an insulation component for use in an airplane, comprising a first fibrous layer having a first density and a second fibrous layer chemically bound to the first fibrous layer. The second fibrous layer has a second density less than the first density. The first and second fibrous layers comprise a similar material. The first density provides the insulation component with enough rigidity to be self-supporting. The average fiber diameter of the fibers in the first and second fibrous layers is less than 20 µm. The first and second fibrous layers may include a fiberglass material. The first and second fibrous layers may be cohesively bound together. The second density may provide the insulation component to have a rigidity of less than 1 inch of droop at a surface area of 22 inches by 8.5 inches. The insulation component may further comprise a third fibrous layer chemically bound to at least one of the first or second fibrous layers, the third fibrous layer having a third density different than the first and second densities. The third density may be greater than the first and second densities and the third fibrous layer may be positioned on top of the first fibrous layer and the first fibrous layer is positioned on top of the second fibrous layer. The third density may be substantially similar to the second density and the third fibrous layer may be positioned on top of the first fibrous layer and the first fibrous layer is positioned on top of the second fibrous layer. The first and second fibrous layers may provide the insulation component to have at least one of a flame propagation resistance value of less than 2 inches of material scorched and less than 3 seconds of after flame time from being tested via radiant panel and a water absorption of less than 20 g of water absorption on a sample of 10 inches by 10 inches by 4 inches or less that was submerged in water for 15 minutes.

A further aspect of the disclosure provides an insulation component for use in an airplane, comprising a first fibrous layer having a first density and a second fibrous layer chemically bound to the first fibrous layer. The second fibrous layer has a second density different than the first density. The first and second fibrous layers comprise a similar material the first density provides the insulation component with enough rigidity to be self-supporting. The average density of the first and second fibrous layers is less than 1.5 pcf. The first and second fibrous layers may include a fiberglass material. The first and second fibrous layers may be cohesively bound together. The second density may provide the insulation component to have a rigidity of less than 1 inch of droop at a surface area of 22 inches by 8.5 inches. The first density may be greater than the second density and the insulation component may further comprise a third fibrous layer chemically bound to at least one of the first or second fibrous layers, the third fibrous layer having a third density different than the first and second densities. The third density may be greater than the first and second densities and the third fibrous layer may be positioned on top of the first fibrous layer and the first fibrous layer is positioned on top of the second fibrous layer. The third density may be substantially similar to the second density and the third fibrous layer may be positioned on top of the first fibrous layer and the first fibrous layer is positioned on top of the second fibrous layer. The first and second fibrous layers may provide the insulation component to have at least one of a flame propagation resistance value of less than 2 inches of material scorched and less than 3 seconds of after flame time from being tested via radiant panel and a water absorption of less than 20 g of water absorption on a sample of 10 inches by 10 inches by 4 inches or less that was submerged in water for 15 minutes.

A further aspect of the disclosure provides for a method of manufacturing an insulation component for use in an airplane, comprising providing a cured substrate comprising fibers and an uncured substrate comprising fibers, coupling the cured and uncured substrates together with a binding element to form an amalgam, and curing the amalgam to form the insulation component having a first and second fibrous layer. The first and second fibrous layers comprise a similar material. The first density provides the insulation component with enough rigidity to be self-supporting. The insulation component includes at least one of a fiber diameter less than 20 µm or a density of less than 1.5 pcf. The first and second substrates may include a fiberglass material. The binding element may include a cohesive binder. Curing the amalgam to form the insulation component may include compressing the cured and uncured substrates together to increase a density of the uncured substrate. The cured substrate may be a first cured substrate, and providing the cured and uncured substrates may include providing a second cured substrate and curing the amalgam to form the insulation component may include compressing the first cure substrate, the second cured substrate, and the uncured substrate together to increase a density of the uncured substrate.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 depicts the formation of the insulation component of FIG. 1 with the amalgam of FIGS. 5A-B.

FIG. 8 depicts the formation of the insulation component of FIG. 2 with the amalgam of FIGS. 7A-B.

DETAILED DESCRIPTION

Figure 1:
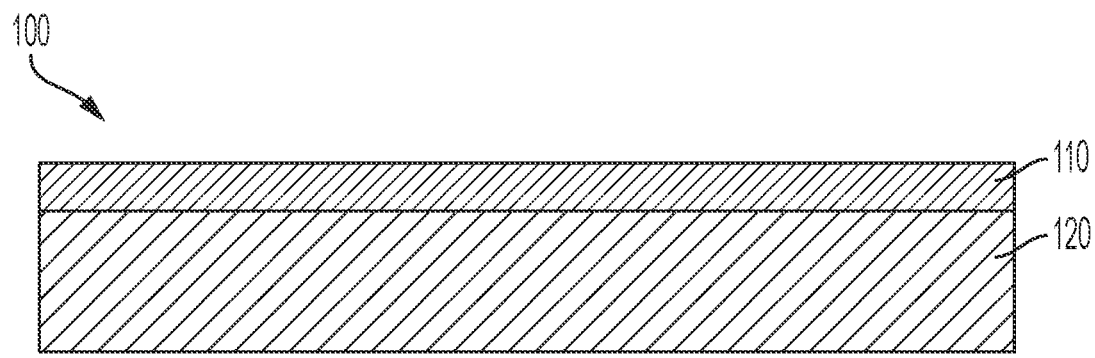
FIG. 1 depicts an exemplary insulation component, according to some embodiments.

The present disclosure relates to an insulation component for use in vehicles. In particular, the present disclosure relates to a materially homogenous insulation component having layers with different densities. In some embodiments, the insulation component may be a fiberglass material.

Aerospace insulation is used throughout an airplane to provide acoustic and thermal insulation. For example, insulation may be secured to the fuselage to minimize the amount of noise and heat transfer between the interior of the aircraft and the sub-zero conditions during flight. The fuselage may be formed by curved walls with supporting structures extending into the interior of the fuselage. The insulation may be secured to the fuselage between these supporting structures.

In some examples, the insulation along the top and side portions of the fuselage (i.e., the crown and sidewall portions of the fuselage) may be installed on the fuselage between the support structures and against the walls of the fuselage. In this example, the insulation in these regions is supported by the walls of the fuselage itself and may not have the rigidity to support its shape and position without being laid against the fuselage wall (i.e., the insulation in these regions are not self-supporting).

One example of insulation capable of being used in the top and side regions of the fuselage may include a fiberglass composite insulation. Such a fiberglass composite insulation may be constructed of multiple fiberglass insulation layers that are coupled together through mechanical fasteners (e.g., quilting, tags, or the like). The insulation layers may be chosen such that the combination of layers achieve certain acoustic and thermal insulation properties. This composite insulation may then be installed along the fuselage walls. However, such a mechanical coupling may allow one layer to move relative to the other, which increases the risk of damage to each layer. Further, such relative movement decreases the overall rigidity of the composite insulation, which may limit the usage of such composite insulation in certain locations that require greater rigidity. Additionally, such mechanical fasteners may fail or break over time, which results in the insulation layers coming apart. Accordingly, it would be beneficial for insulation having multiple layers to be joined together in a manner that increases the damage-tolerance and efficacy of the insulation.

Other areas of the fuselage may require self-supporting insulation. For example, the bilge area, or an area of the airplane (usually in the lower part of the fuselage) where water collects due to the condensation formed in the fuselage (e.g., from water vapor in in the air condensing due to the cold temperatures outside of the fuselage), may require self-supporting insulation. Specifically, the insulation in the bilge area must be positioned between the supporting structures that extend from the wall of the fuselage but at a distance from the wall of the fuselage such that a space is defined between the insulation and the wall to allow for moisture to collect. As the insulation in the bilge areas are not directly supported by the walls of the fuselage, the insulation in this region must have enough rigidity to be self-supporting.

One example of insulation capable of being used in the bilge area may include polyimide foam insulation. Polyimide foam insulation may have sufficient thermal/acoustic insulative qualities for use in an airplane while also being rigid enough that it may be self-supporting when installed in the bilge area. However, polyimide foam is expensive due to, in part, the extensive fabrication required to ensure that polyimide foam meets certain legal flame-resistance requirements (such as the Federal Aviation Administration mandated flame-resistance regulations). Accordingly, it would be beneficial for insulation to be made of a more cost-effective material while still having similar (or better) thermal/acoustic insulative, water-resistance, and flame-resistance qualities.

The present disclosure relates generally to a semi-rigid insulation having multiple layers chemically bound together. In particular, the insulation of the present disclosure may be a materially homogeneous structure having layers of different density. The material may be a cost-effective material, such as fiberglass. One of the layers may be a high-density layer to provide sufficient rigidity and structure to the insulation. The rigidity and structure provided by this high-density layer may be sufficient to allow for the insulation to be self-supporting insulation while also being made of cost-effective material.

The insulation may be rigid where the insulation can substantially maintain its shape when held aloft but cannot easily deform in shape without damaging the insulation. The insulation may be semi-rigid where the insulation can substantially maintain its shape when held aloft and can deform to a degree (e.g., the insulation may conform to a curved wall of an airplane) without damaging the insulation. The insulation may be flexible where the insulation cannot maintain its shape when held aloft and may be substantially deformable without structurally damaging the insulation.

I. Exemplary Insulation Components

Exemplary insulation components are described below.

A. First Exemplary Insulation Component

FIG. 1 depicts a cross-sectional view of an exemplary insulation component 100. The insulation component 100 includes a skin layer 110 and a second core layer 120. Although FIG. 1 depicts two insulation layers 110, 120, in other embodiments, there may be more than two insulation layers, as described further below. Each of the insulation layers 110, 120 may be chemically bound together as a cured matrix (e.g., the crosslinking of polymer chains) by a binding element, as discussed below, such that the installation component 100 is monolithic. Specifically, the insulation component 100 may include no gaps between the layers 110, 120 and no weak points to separate the layers 110, 120 from each other.

Further, the insulation component 100 may be materially homogenous in that the layers 110, 120 are formed of substantially the same material, although of different densities and stiffnesses. For example, the insulation component 100 may be formed of substantially the same material when the materials of each of the layers 110, 120 are the same by about 50 wt. % to about 99.5 wt. %. Alternatively, the materials of the layers 110, 120 may be substantially the same when the materials of the layers 110, 120 are the same by about 75 wt. % to about 99 wt. %, about 80 wt. % to 90 wt. %, or about 90 wt. % to about 99 wt. %.

In some embodiments, the layers 110, 120 are bonded together such that they have a parting strength of at least about 120 g/g (e.g., at least about 150 g/g). An exemplary range for the ordinary parting strength may be about 120 g/g to about 400 g/g. In some embodiments, the ordinary parting strength may be between about 150 g/g to 350 g/g, between about 200 g/g to 300 g/g, or between about 225 g/g to 275 g/g.

Each of the insulation layers 110, 120 may have a different density that each provide a corresponding different rigidity. In particular, a higher density layer 110, 120 may provide the insulation component 100 with a greater rigidity while a lower density layer 110, 120 may provide a lower rigidity (i.e., be more flexible). For example, the skin layer 110 may have a higher density relative to the core layer 120 such that the skin layer 110 may be rigid or semi-rigid and the core layer 120 may be flexible. However, in other embodiments, both of the layers 110, 120 may be any of semi-rigid, rigid, or flexible.

The density of the skin layer 110 may be sufficiently high to provide the insulation component 100 with enough rigidity that the insulation component 100 is rigid or semi-rigid. In this manner, the insulation component 100 may be installed on, for example, a bilge area of an airplane fuselage and be self-supporting (i.e., able to maintain its shape and position without any backing surface). For example, the insulation component 100 may have a rigidity, as measured by droop level of about 1 inch or less with a sample size having a surface area of 22 inches by 8.5 inches and a thickness of between about 0.5-2 inches. For example, the insulation component 100 may have a droop level at the areas described above between about 0.1-0.9 inches, 0.25-0.75 inches, or 0.4-0.6 inches. In particular, such a droop level may be achieved with the skin layer 110 having a thickness of about 0.25 inches. may have a thickness between about 0.13 inches to 0.25 inches. In some embodiments, to achieve such a droop level, the skin layer 120 may have a thickness between about 0.15 inches to 0.23 inches, between about 0.17 inches to 0.2 inches, or between about 0.18 inches to 0.19 inches.

In other embodiments, the insulation component 100 may have a rigidity of less than 1 inch of droop at a surface area corresponding to a bilge area of an airplane as it may be desirable to prevent the insulation component 100 from interacting with the fuselage walls where the water collects to prevent damage to the insulation component 100. The space between the insulation component 100 and the fuselage wall where the moisture collects may be just greater than 1 inch such the insulation component 100 may be installed in those bilge areas to have enough rigidity (and be sufficiently self-supporting) that the insulation component 100 would not droop to touch those fuselage walls.

In one embodiment, the insulation component 100 may preferably have a density of 0.34 pfc. However, in other embodiments, the insulation component 100 may have a variety of density ranges, formed from averaging the densities of the layers 110, 120, such as between about 0.2-1.5 pounds per cubic foot (pcf). Alternatively, the insulation component may have a density between about 0.25-1.2 pcf, between about 0.275-1 pcf, between about 0.3-0.8 pcf, between about 0.325-0.6 pcf, or between about 0.33-0.5 pcf. The low-density values of the insulation component 100 may reduce the total weight of the insulation component 100 required to achieve the desired level of thermal/acoustic insulation for use in aircraft compared to other settings. The low-density values of the insulation component 100 are an important consideration for insulation used in airplanes as optimizing airplane performance may include reducing the weight of the plane while maintaining a certain amount of structural integrity. For example, insulation used in heating, ventilation, and air condition (HVAC) settings in buildings consider density in terms of their ability to provide airflow resistance. Specifically, building or HVAC insulation may be provided at a certain minimum density so that the HVAC insulation are not torn off by the air flowing through it when installed in a building. As such, building or HVAC insulation would not include density values as low as those described above as doing so would render such insulation too weak to withstand the airflow passing through it.

On the other hand, insulation used in airplane (e.g., in the bilge area of an airplane) are not exposed to the airflow rates experienced by insulation used in building or HVAC. For example, airplane insulation may be provided away from any air flow and in a bag with flow-resistive qualities (e.g., polymeric bags) to further prevent air from flowing through the airplane insulation. Rather, insulation used in airplanes are directed more to decreasing the density of the insulation to decrease the total weight of the airplane while providing for certain acoustic and thermal insulative qualities. In this manner, the insulation component 100 may be installed in an airplane to provide the acoustic and thermal insulation qualities described herein while having the rigidity to be self-supporting and the low-density values as described above.

The skin layer 110 may have a density in ranges sufficiently high to provide the insulation component 100 with enough rigidity that the insulation component 100 is self-supporting, as discussed above. For example, the skin layer 110 may have a density in the range from about 1.5-6 pounds per cubic foot (pcf). In some cases, the density of the skin layer may be between about 2-5 pcf, 2.5-4.5 pcf, 3-4 pcf, or 3.5-4.5 pcf.

The core layer 120 may have a density in ranges to provide the acoustic/thermal insulative qualities as described below. For example, core layer 120 may have a density in the range from about 0.3-1.5 pcf. In some cases, the density of the core layer 120 may be between about 0.32-1.3 pcf, 0.34-1.1 pcf, 0.5-1 pcf, 0.6-0.9 pcf, or 0.7-0.8 pcf. The core layer 120 may be more flexible than the skin layer 110 due to the lesser density of the core layer 120.

As noted above, the insulation layers 110, 120 may be a substantially similar material. This material may be a flame-resistant and water-repellant material such that the insulation component 100 has a certain level of flame resistance (e.g., a flame propagation resistance) and water repellence, as described below.

For example, such material may have a flame resistance to satisfy the legal requirement as set forth under 14 C.F.R. § 25.856. In particular, the insulation component 100 may have an after-flame time of less than 3 seconds and a flame propagation length of less than 2 inches from being tested via radiant panel with a sample size of 12 inches by 24 inches at a thickness between about 0.5-2 inches. This flame resistant quality may be beneficial when the insulation component 100 is installed in airplanes to minimize flame propagation within aircraft or to increase fuselage burn-through time. The fire risk on an airplane can be disastrous as the means of putting out or controlling a fire are limited and, while the airplane is flying, there is no means to simply let the fire burn out. Further, certain government organizations (e.g., the Federal Aviation Administration) may enforce strict flammability requirements, as noted above, that, if not met, will prevent the use of insulation on certain airplanes (e.g., commercial airplanes). As such, the flame resistance of the insulation component 100 may both reduce the risk of fire danger to the airplane, and allow it to be commercially sold and used.

Insulation used in other settings (e.g., building or HVAC settings, or the like) may not include similar flame resistance values as achieving such values may be unnecessary and prohibitively expensive. For example, building or HVAC insulation may follow the flame resistance requirements set forth under American Society for Testing and Materials (ASTM) E84. Such requirements may be less stringent than the test set forth for airplanes. On the other hand, the flame resistance values noted above for insulation used in airplanes may be achieved, in part, by, for example, a particular type of binding element, as discussed below. Such binding elements may be prohibitively expensive where such insulation does not require the particular level of flame resistance as insulation required in an airplane. As such, building or HVAC insulation would not include the flame resistance values as those described above.

The insulation layers 110, 120 may be water repellant. For example, the insulation component 100 may have water absorption levels of about 0.5 wt. % or less, based on the weight of the insulation component 100. The insulation component 100 may be sufficiently water repellant to satisfy the requirements under the American Society for Testing and Materials (ASTM) C800 and C1511. Specifically, the insulation component 100 may have a water absorption of less than 20 g of water absorption when submerged in water for 15 minutes and then allowed to drain for 1 minute on a sample of 10 inches by 10 inches by up to 4 inches in thickness. As noted above, achieving this level of water repellence may be prohibitively expensive (e.g., requiring a particular type of binding element and/or material) for insulation used outside of the airplane setting. For example, it would not be feasible or desirable for insulation used in the building or HVAC to have such high levels of water repellence due to the high cost and lack of need.

This water repellence may be beneficial for installing the insulation component 100 in locations that may be in close proximity to liquids. For example, if the insulation component 100 is installed at the bilge areas in an airplane do not have a certain level of water-resistance, the insulation component may absorb at least some water during the flight. This may lead to the insulation losing its thermal or acoustic insulative qualities. As such, the water-resistance of the insulation component 100 may allow for the insulation component 100 to be installed in locations proximate to water (e.g., the bilge areas in an airplane) while reducing the risk of damage and efficacy.

Examples of materials for the insulation component 100 may include fiberglass based materials made of an inorganic material (e.g., woven or non-woven fibers) adhered together with a binding element, such as a thermosetting binder or resin. The fibers may include one or more fibers such as glass fibers, carbon fibers, among other kinds for fibers. In embodiments, the fibers may make up about 50 wt. % to about 99.5 wt. % of the fiberglass-containing products. Additional exemplary fiber weight ranges include about 90 wt. % to about 99 wt. %; and about 75 wt. % to about 95 wt %.

The insulation component 100 may preferably be made of a fiberglass material. Fiberglass material may offer certain benefits over other materials. For example, fiberglass may include the flame resistance and water repellent values as noted above while also being more cost effective than other materials. For example, fiberglass material may provide better flame resistant and water repellant qualities as polyimide foam and may also be cheaper than the polyimide foam (e.g., by around 400%). While the fiberglass layers, separately, may normally be flexible, the fiberglass insulation component 100 may not be flexible due to rigidity provided by the high density of the skin layer 100. Specifically, the chemical bonding between the layers 110, 120 from the manufacturing process may allow the rigidity of the skin layer 110 be transferred to the more flexible core layer 120 in a more efficient manner than other means of connection, such as mechanical fasteners between layers (e.g., clips, tags, or the like). Unlike using mechanical fasteners to couple the layers 110, 120 together, the chemical bonding of the layers 110, 120 prevents the layers 110, 120 from moving relative to each other. Moreover, the chemical bond between the layers 110, 120 do not break down over time to loosen the connection between the layers 110, 120 as might be the case for mechanical fasteners. As such, a fiberglass insulation component 100 may be more cost-effective than other materials (e.g., polyimide foam) while also possessing similar flame-resistant and water-repellent qualities as those other materials and being more damage-resistant than using mechanical fasteners to form fiberglass insulation.

The acoustic insulation of the insulation component 100 may be based on the fiber diameter of the insulation component 100. The insulation component 100 may have a fiber diameter, formed from averaging the fiber diameters of the layers 110, 120, of less than about 2 μm. For example, the insulation component 100 may have a fiber diameter between 0.1-20 μm, 0.2-18 μm, 0.5-15 μm, 0.75-10 μm, 1-8 μm, 1.5-5 μm, or 1.6-3 μm. The insulation component 100 may include such fine fiber diameters to improve the acoustic insulation provided by the insulation components 100. This may be much finer than insulation used in other settings, such as building or HVAC settings, because acoustic insulation is an important consideration when used in airplanes due to the noise outside of the airplane. Further, the finer fiber diameter contributes to reducing the weight of the insulation component 100, which reduces the weight of the overall airplane once installed. Moreover, manufacturing insulation with such fine fiber diameters is significantly more time-consuming and costly (e.g., greater than five times as expensive) than manufacturing insulation with larger fiber diameters. As such, building or HVAC insulation may not include such small fiber diameters as they are directed to a different use and the costs may be prohibitive.

Each of the layers 110, 120 may have different fiber diameters. For example, the skin layer 110 may include a fiber diameter of between about 2-8 µm. For example, the skin layer 110 may include a fiber diameter between about 2.5-7.5 µm, 3-5 µm, 4-6 µm, or 3.5-5.5 µm. The core layer 120 may include a fiber diameter between about 0.5-20 µm. For example, the core layer 120 may include a fiber diameter between about 0.9-16 µm, 1.1-12 µm, 1-10 µm, or 1.1-5 µm. These differences in fiber diameter may allow the insulation component 100 to achieve the total fiber diameter, as discussed above, while minimizing the costs of manufacturing the insulation component 100. Specifically, because the fiber diameter of the skin layer 110 is larger than the core layer 120, the skin layer 110 may be cheaper to manufacture than the core layer 110 in regard to fiber diameter. This may decrease the cost of manufacturing the insulation component 100 while still manufacturing the insulation component 100 to have the desired acoustic/thermal insulative qualities.

The use of fiberglass for layers 110, 120 may additionally provide greater acoustic insulation (e.g., acoustic absorption) over other materials. For example, the higher density and the smaller fiber diameter of the fiberglass skin layer 110 in combination with the fiberglass core layer 120 may provide a greater level of acoustic insulation than materials such as polyimide foam. In particular, the fiberglass skin layer 110 in combination with the core layer 120 may provide a one and a half to three-times better acoustic impedance at frequency ranges greater than 500 Hz when tested via the testing procedure American Society for Testing and Materials (ASTM) E1050. For example, the insulation component 100 may provide: at 800 Hz, an acoustic impedance greater than 0.8 compared to under 0.5 for polyimide foam; at 1200 Hz, acoustic impedance of around 0.9 compared to around 0.5 for polyimide foam; and at 3000 Hz, an acoustic impedance approaching 1 compared to 0.6 for polyimide foam.

The layers 110, 120 may be chemically bound together with a binding element. As will be discussed below, this binding element may be a set binding element from as a result of a curing process, as discussed below. The binder may include an effective amount of a water repellant to limit the intrusion of aqueous matter after the binder is set. For example, vinyl acrylate latex copolymers may further incorporate stearylated melamine for improvement in water repellency. Exemplary concentrations of the stearylated melamine may include about 3 wt. % to 10 wt. %, (e.g., about 6 wt. %). The stearylated melamine may be in liquid form having a solids content of about 40 wt. percent and is mixed with a suitable copolymer latex and water to prepare the binder. In other embodiments, the binding element may include a silicone material (e.g., reactive silicone) to improve its water repellency. This material mixture may have a pH of about 9, a viscosity of about 45 centipoises and be anionic.

The binder may be a cohesive binder. Examples of a cohesive binder may include, for example, formaldehyde-containing binder compositions. Such compositions may include phenol-formaldehyde (PF) binder compositions, phenol-urea-formaldehyde (PUF) binder compositions, urea-formaldehyde (UF) binder compositions, and melamine-formaldehyde (MF) binder compositions, among other formaldehyde-containing binder compositions. In embodiments, PF binder compositions may include resole binder compositions where the amount of formaldehyde (by mole) exceeds the amount of phenol. Phenol-to-formaldehyde mole ratios in these resole binder compositions range from 1:1 to 1:5 (e.g., 1:1.2 to 1:4.5; 1:1.5 to 1:2.5; etc.). In further embodiments, the PF binder compositions are aqueous compositions characterized by a total solids concentration greater than or about 30 wt. %, greater than or about 40 wt. %, greater than or about 50 wt. %, greater than or about 60 wt. %, or more. Other example binders may be described in U.S. patent application Ser. No. 17/318,430 entitled "Formaldehyde-Containing Products With Reduced Formaldehyde Emissions," which is incorporated by reference herein in their entirety.

In one example, the layers 110, 120 may preferably be chemically bound together using a cohesive formaldehyde binder. For example, when set, the binder may include water repellant materials such that the insulation component 100 may have the water repellent values as noted above. Moreover, when set, the binder may contribute to the insulation component 100 having flame propagation resistance values as described above. In particular, cohesive binders may be preferred where the insulation component 100 is used in an airplane as adhesives are more flammable than the cohesive binder. Such binder properties may allow the insulation component 100 to be installed in the bilge area of the airplane so as not to interfere with the collection of water and minimize the risk of fire. In other settings, such as in building or HVAC settings, insulation may not require as much water repellence and flame resistance as in airplanes. For example, manufacturing insulation to include such water repellent values (e.g., by including reactive silicone in the binder) may be prohibitively expensive where such values are not needed. As such, the building or HVAC insulation would not include binders that, when set, provide the water repellent and flame resistance levels as described above.

B. Second Exemplary Insulation Component

Figure 2:
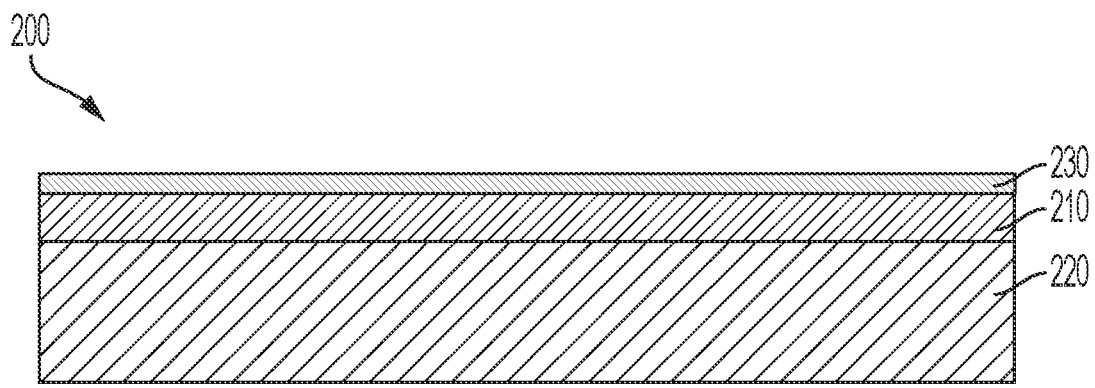
FIG. 2 depicts an exemplary insulation component, according to some embodiments.

In other embodiments, the insulation component may have more layers than the insulation component 100. For example, FIG. 2 depicts a cross-sectional view of an example insulation component 200 including a skin layer 210, core layer 220, and a facer layer 230. It is understood that features ending in like reference numerals as features discussed above are similar, except as noted below. The facer layer 230 may be any of the materials listed above and may be chemically bound to the skin layer 210 with a binding element as described above. In some embodiments, the layers 210, 220, 230 may be substantially the same material. The facer layer 230 may be thinner than the skin layer 220. For example, the facer layer 230 may have a thickness of between about 0.013 inches to 0.042 inches. In some embodiments, to achieve the droop level as discussed above, the facer layer 230 may have a thickness between about 0.02 inches to 0.04 inches, between about 0.025 inches to 00.35 inches, or about 0.03 inches.

The density of the insulation component 200 may preferably be between about 0.34-0.6 pcf, formed from averaging the densities of the layers 210, 220, 230. However, the insulation component 200 may have other density ranges, such as those described above for the insulation component 100. In this manner, the insulation component 200 may have a similar density as the insulation component 100. Such similar densities may be achieved by decreasing at least one of the densities of the thickness or density of the skin layer 210 and core layer 220 relative to, respectively, the skin layer 110 and core layer 120. However, in other embodiments, the layers 210, 220, 230 may have any density such that the insulation component 200 may have a total density different than the insulation component 100.

The facer layer 230 may be denser the skin layer 210 and core layer 220. For example, the facer layer 230 may have a density between about 6.5-8.5 pcf. However, the facer layer 230 may have other ranges, such as between about 6.75-8.25 pcf, 7-8 pcf, between about 7.25-7.75 pcf. The relatively higher density of the facer layer 230 compared to the skin layer 210 and core layer 220 provides greater rigidity to the insulation component 200 than just the skin layer 210 and core layers 220 alone (e.g., compared to the insulation component 100). The insulation component 200 may have a greater rigidity than the insulation component 100 due to having both the skin layer 210 and facer layer 230 whereas the insulation component 100 only includes the skin layer 110.

The facer layer 230 may be made of a non-woven glass fiber material. This non-woven glass fiber facer layer 230 may alter the insulative qualities of the insulation component 200 relative to the insulation component 100 when compared to other materials, such as polyimide foam. For example, the facer layer 230 may affect the acoustic insulation of the insulation component 200 at different ranges compared to the insulation component 100. Specifically, the facer layer 230 may have a fiber diameter that contributes to the insulation component 200 having an increased acoustic performance compared to polyimide foam at frequency ranges greater than 1000 Hz when tested via ASTM E1050. For example, the facer layer 230 may include a fiber diameter between about 8-18 µm. In other embodiments, the facer layer 230 may include a fiber diameter between about 10-16 µm, 12-14 µm, or 12.5-13.5 µm. The facer layer 230 may include a preferred fiber diameter of 13 µm. The insulation component 200 may have greater acoustic absorption than the insulation component 100 as the addition of the facer layer 230 may increase the total thickness of the insulation component 200 to be greater than the insulation component 100.

Although FIG. 2 depicts the facer layer 230 positioned on top of the skin layer 210 and the skin layer 210 positioned on top of the core layer 220, in other embodiments, the layers 210, 220, 230 may be in any position relative to each other in forming the insulation component 200.

C. Third Exemplary Insulation Component

Figure 3:
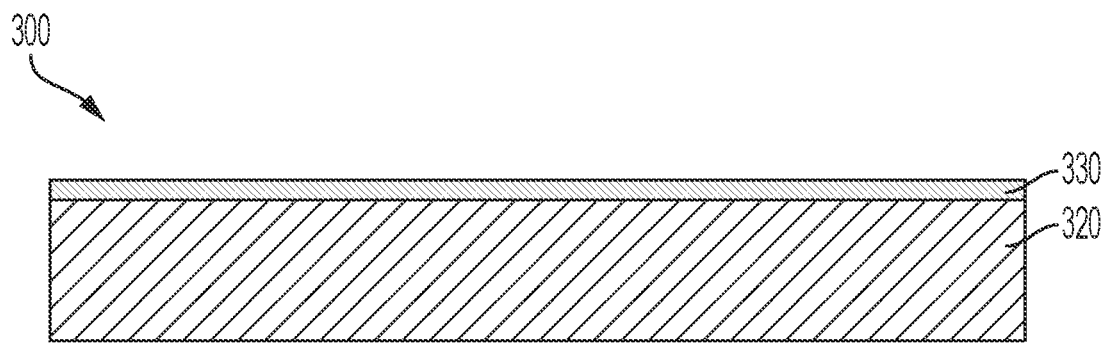
FIG. 3 depicts an exemplary insulation component, according to some embodiments.

In other embodiments, the insulation component may have a different combination of layers than the insulation components 100, 200. For example, FIG. 3 depicts a cross-sectional view of an example insulation component 300 including core layer 320 and a facer layer 330. It is understood that features ending in like reference numerals as features discussed above are similar, except as noted below. The layers 320, 330 may be any of the materials listed above and may be chemically bound together with a binding element as described above. In some embodiments, the layers 320, 330 may be substantially the same material.

As discussed below, the insulation component 300 may have different structural and insulative qualities than the insulation components 100, 200 due to the differing layers 320, 330 compared to the layers of the insulation components 100, 200. For example, the insulation component 300 may have less rigidity than the insulation components 100, 200 because the facer layer 330 may not provide as much structural rigidity compared to the skin layers 120, 220 due to how thin the facer layer 330 is. Moreover, the insulation component 300 may have less acoustic absorption than the insulation component 100, 200 as the insulation component 300 may have a lesser thickness than insulation component 100, 200.

D. Fourth Exemplary Insulation Component

Figure 4:
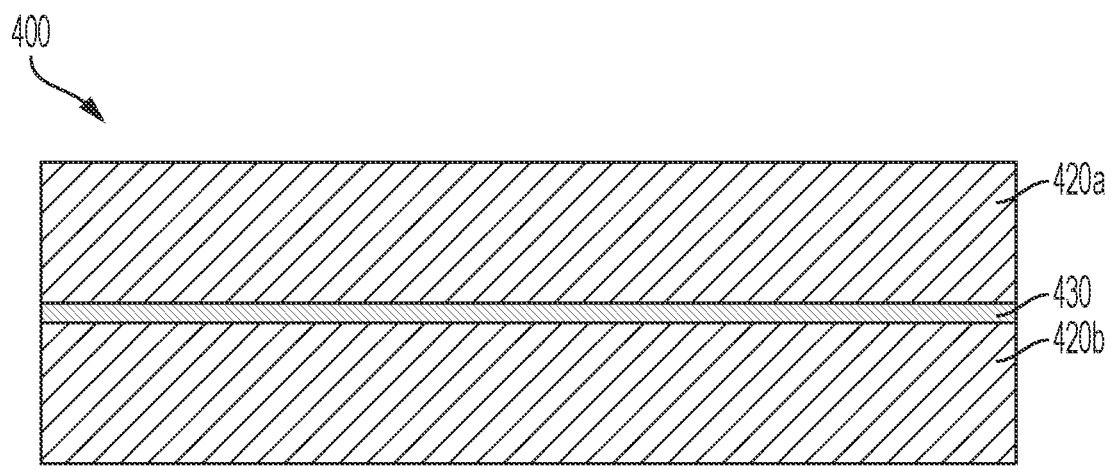
FIG. 4 depicts an exemplary insulation component, according to some embodiments.

In other embodiments, the insulation component may have a different combination of layers than the insulation components 100, 200, 300. For example, FIG. 4 depicts a cross-sectional view of an example insulation component 400 including core layers 420a,b and a facer layer 430. It is understood that features ending in like reference numerals as features discussed above are similar, except as noted below. The layers 420a,b, 430 may be any of the materials listed above and may be chemically bound together with a binding element as described above. In some embodiments, the layers 420a,b, 430 may be substantially the same material.

The insulation component 400 may have different structural and insulative qualities than the insulation components 100, 200, 300 due to the differing layers 420a,b, 430 compared to the layers of the insulation components 100, 200, 300. Specifically, the insulation component 400 includes an increased overall thickness and density of the insulation component 400 compared with the other insulation components 100, 200, 300. In one example, the layers 420a,b may have substantially similar densities. For example, the density of the layers 420 a,b may be substantially the same when the densities are about 50% to about 99.5% the same. Alternatively, the density of the layers 420 a,b may be substantially the same when the densities of the layers 420 a,b are about 75% to 99% the same, about 80% to 90%, the same or about 90% to about 99% the same. However, in other embodiments, the layers 420a,b may have different densities. For instance, where the core layer 420a has a higher density than 420b, the core layer 420a may provide some rigidity to the insulation component 300. However, in other embodiments, the layers 420a,b may have the same densities.

The insulation component 400 may have a lesser rigidity than the insulation components 100, 200 as a result of not having a skin layer but greater rigidity than the insulation component 300 due to having the second core layer 420a. The insulation component 400 may have a greater acoustic absorption than the insulation components 100, 200, 300 due to having the largest thickness relative to those other insulation components 100, 200, 300.

II. Exemplary Manufacturing Methods

Exemplary manufacturing methods for the insulation components 100, 200, 300, 400 are described below. The manufacturing methods are depicted in exemplary schematic images and flowcharts.

A. Exemplary Manufacturing Process

FIGS. 5-12 depict an exemplary process for forming the insulation components 100, 200, 300, 400.

1. Forming the First Exemplary Insulation Component

Figure 5A:
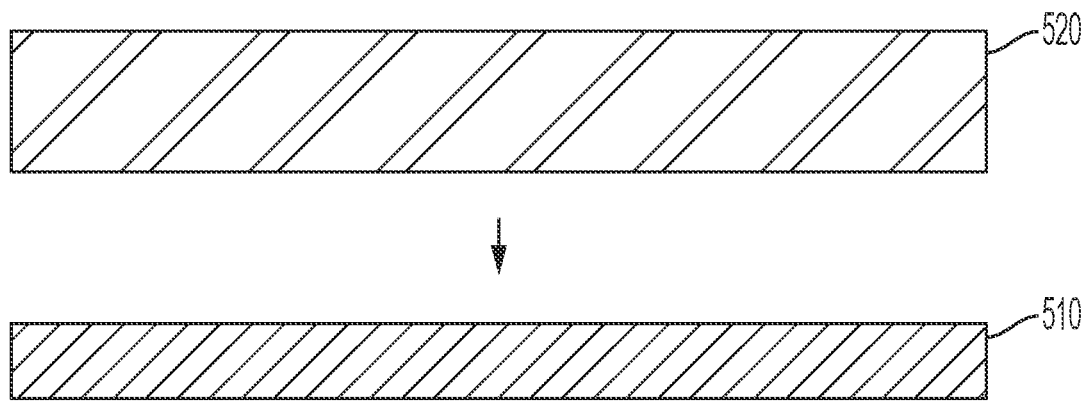
FIGS. 5A-B depict the formation of an exemplary amalgam, according to some embodiments.
Figure 5B:
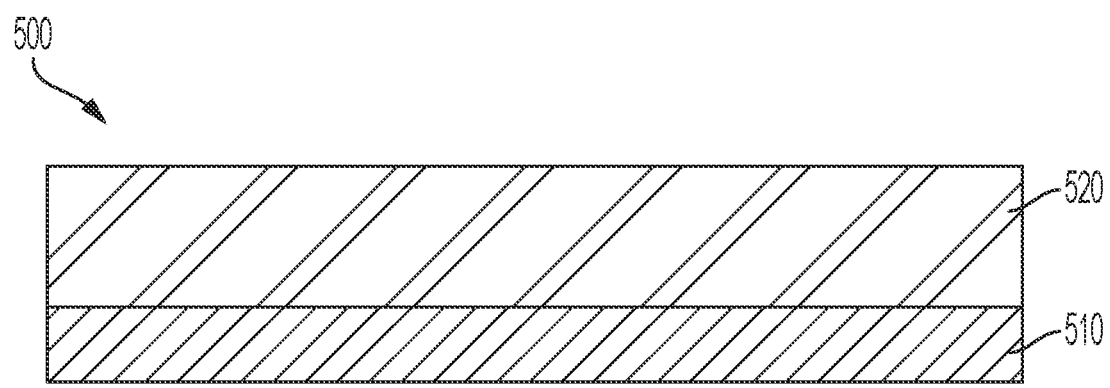

FIGS. 5-6 depict the formation of the insulation component 100. FIGS. 5A-B depict the formation of an amalgam 500 made of the skin substrate 510 and the core substrate 520. FIG. 5A depicts the skin substrate 510 and the core substrate 520 being provided. The skin substrate 510 may be provided on a surface (e.g., a conveyor belt) in an uncured form. The skin substrate 510 may be a mixture of glass fibers mixed with an uncured binding element. For example, the skin substrate 510 may be formed by a deposition of fibers on the surface and then having an uncured binding element applied on the fibers (e.g., through one of spraying, curtain coating, spin coating, dip coating, among other contacting techniques). However, in other embodiments, the skin substrate 510 may be any of the materials listed above.

The core substrate 520 may be provided in a cured form (e.g., similar to core layers 120, 220, 320, 420a,b). For example, the core substrate 520 may be made of a fiberglass material held together by a cured binding element. However, in other embodiments, the core substrate 520 may be any of the materials listed above. The core substrate 520 may be coupled to the skin substrate 510 while the skin substrate 510 is uncured to form an amalgam 500, as shown in FIG. 5B. For example, the core substrate 520 may be pressed on top of the skin substrate 510 to couple the substrates 510, 520 together. However, in other embodiments, the skin substrate may be positioned on top of the core substrate when being pressed.

Turning to FIG. 6, the amalgam 500 may be introduced into a curing system 600 to form the insulation component 100. The curing system 600 may include a conveyor belt 610, a plate 620, and a curing oven 630. Specifically, the amalgam 500 may be transported along the conveyor belt 610 into the curing oven 630 where the amalgam 500 is heated to a curing temperature and the binding element starts to cure. The temperature of the curing oven 630 and the speed of the conveyor belt 610 may be adjusted to control the curing time and temperature of the amalgam 500. In some embodiments, temperature and speed may be set to completely cure the binding element such that the amalgam 500 cures into the insulation component 100. However, in other embodiments, the temperature and speed may be set to partially cure the amalgam 500.

The amalgam 500 may be compressed prior to or during the curing stage. For example, the amalgam 500 may be compressed between the conveyor belt 610 and plate 620 while the amalgam 500 is in the curing oven 630. This compresses the amalgam 500 to have less thickness than when it first made contact with the plate 620. As the skin substrate 510 is uncured while the core substrate 520 is cured, the skin substrate 510 is more malleable than the core substrate 520. As such, compressing the amalgam 500 compresses the less malleable core substrate 520 against the more malleable skin substrate 510 to increase the density of the skin substrate 510. However, in other embodiments, there may be other means of compressing the amalgam 500 than as shown.

Heating and compressing the amalgam 500 may cure the binding element such that the amalgam 500 cures into the insulation component 100 to have an increased density relative to the amalgam 500. Specifically, this increases the density of the skin substrate 510 such that the skin substrate 510 is cured to be the skin layer 110, including having the increased density and rigidity of the skin layer 110. As the core substrate 520 is already cured prior to the curing stage, the density of the core substrate 520 is substantially the same as after this curing stage, when the core substrate 520 becomes the core layer 120. However, in other embodiments, the core substrate 520 may also increase in density.

In other embodiments, the skin substrate 510 may be cured and the core substrate 520 may be uncured. In this embodiment, the position of the skin substrate 510 may be switched with the core substrate 520 during the manufacturing process.

2. Forming the Second Exemplary Insulation Component

Figure 7A:
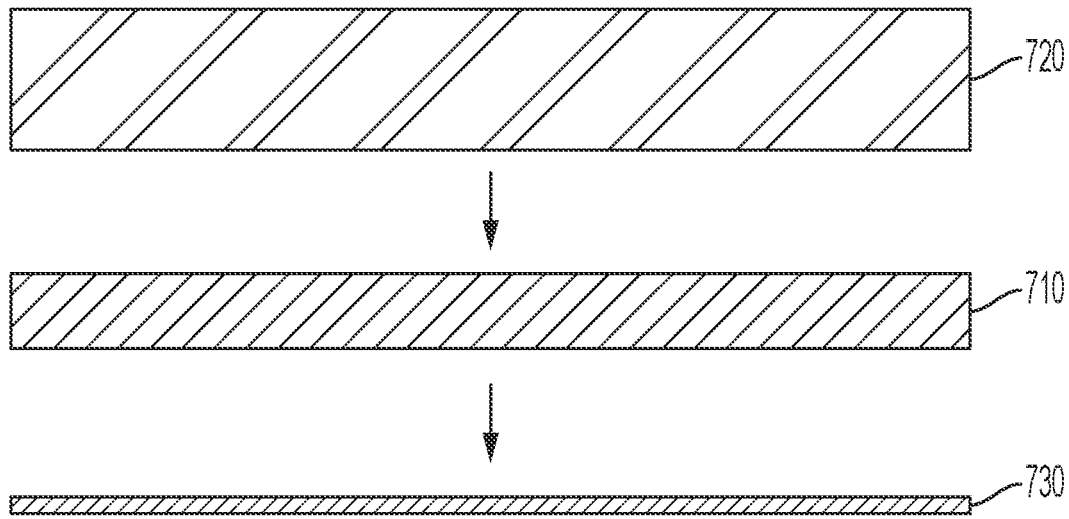
FIGS. 7A-B depict the formation of an exemplary amalgam, according to some embodiments.
Figure 7B:
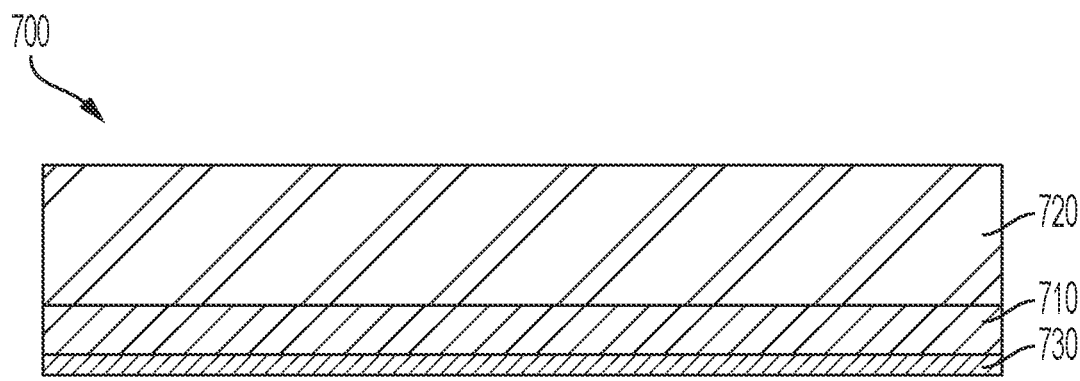

FIGS. 7-8 depict the formation of the insulation component 200. FIGS. 7A-B depict the formation of an amalgam 700 made of the core substrate 720, the skin substrate 710, and facer substrate 730. It is understood that features ending in like reference numerals as features discussed above are similar, except as noted below. The core substrate 720 and the facer substrate 730 may be provided on a surface (e.g., a conveyor belt) in a cured form. The skin substrate 720 may be provided in an uncured form. However, in other embodiments, the facer substrate may be provided in an uncured form. In a yet further embodiment, the skin substrate may be provided in a cured form.

The skin substrate 710 may be coupled to the facer substrate 730 while the skin substrate 710 is uncured by pressing or the like to form the amalgam 700, shown in FIG. 7B. The core substrate 720 may be similarly coupled to the skin substrate 710 after the skin substrate 710 is coupled to the facer substrate 730 or at the same time the skin substrate 710 is coupled to the facer substrate 730.

Turning to FIG. 8, the amalgam 700 may be introduced into the curing system 600, as described above, to form the insulation component 200. The amalgam 700 may be transported along the conveyor belt 610 into the curing oven 630 where the amalgam 700 is heated to a curing temperature and the binding element starts to cure.

The amalgam 700 may be compressed prior to or during the curing stage. For example, the amalgam 700 may be compressed between the conveyor belt 610 and plate 620 while the amalgam 700 is in the curing oven 630. This compresses the amalgam 700 to have less thickness than when it first made contact with the plate 620. As the skin substrate 710 is uncured while the core substrate 720 and facer substrate 730 is cured, the skin substrate 710 is more malleable than the core substrate 720 and facer substrate 730. As such, compressing the amalgam 700 compresses the more malleable skin substrate 710 between the less malleable core substrate 720 and facer substrate 730. In other embodiments, there may be other means of compressing the amalgam 700 than as shown.

Heating and compressing the amalgam 700 may cure the binding element such that the amalgam 700 cures into the insulation component 200 to have an increased density relative to the amalgam 700. Specifically, this increases the density of the skin substrate 710 such that the skin substrate 710 is cured to be the skin layer 210. As the core substrate 720 and facer substrate 730 are already cured prior to the curing stage, the density of the core substrate 720 and facer substrate 730 are substantially the same as after this curing stage, when the core substrate 720 becomes the core layer 220 and the facer substrate 730 becomes the facer layer 230. However, in other embodiments, at least one of the core and facer substrates may also increase in density when respectively becoming the core and facer layers.

Where the insulating component 100 is coupled and compressed on the facer substrate 730, only the facer substrate 730 cures into the facer layer 230. As the insulating component 100 is already cured prior to this curing stage, the density of the insulating component 100 is substantially the same as after this curing stage. However, in other embodiments, the insulating component 100 may also increase in density.

3. Forming the Third Exemplary Insulation Component

Figure 9A:
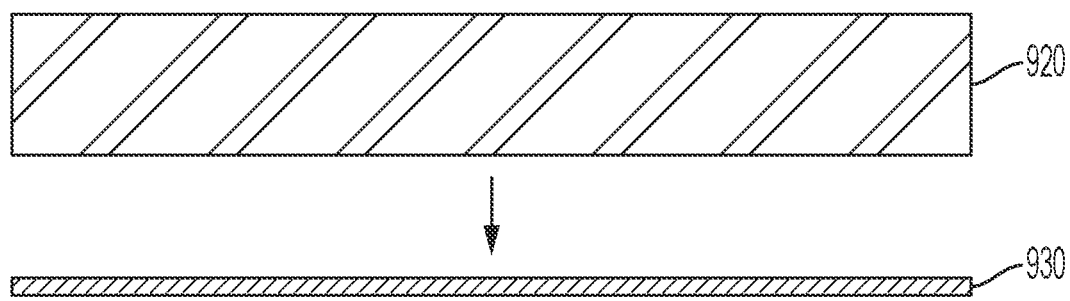
FIGS. 9A-B depict the formation of an exemplary amalgam, according to some embodiments.
Figure 9B:
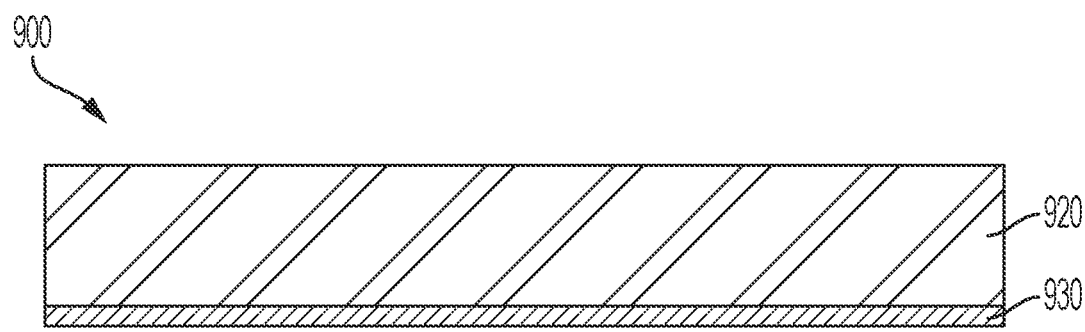
Figure 10:
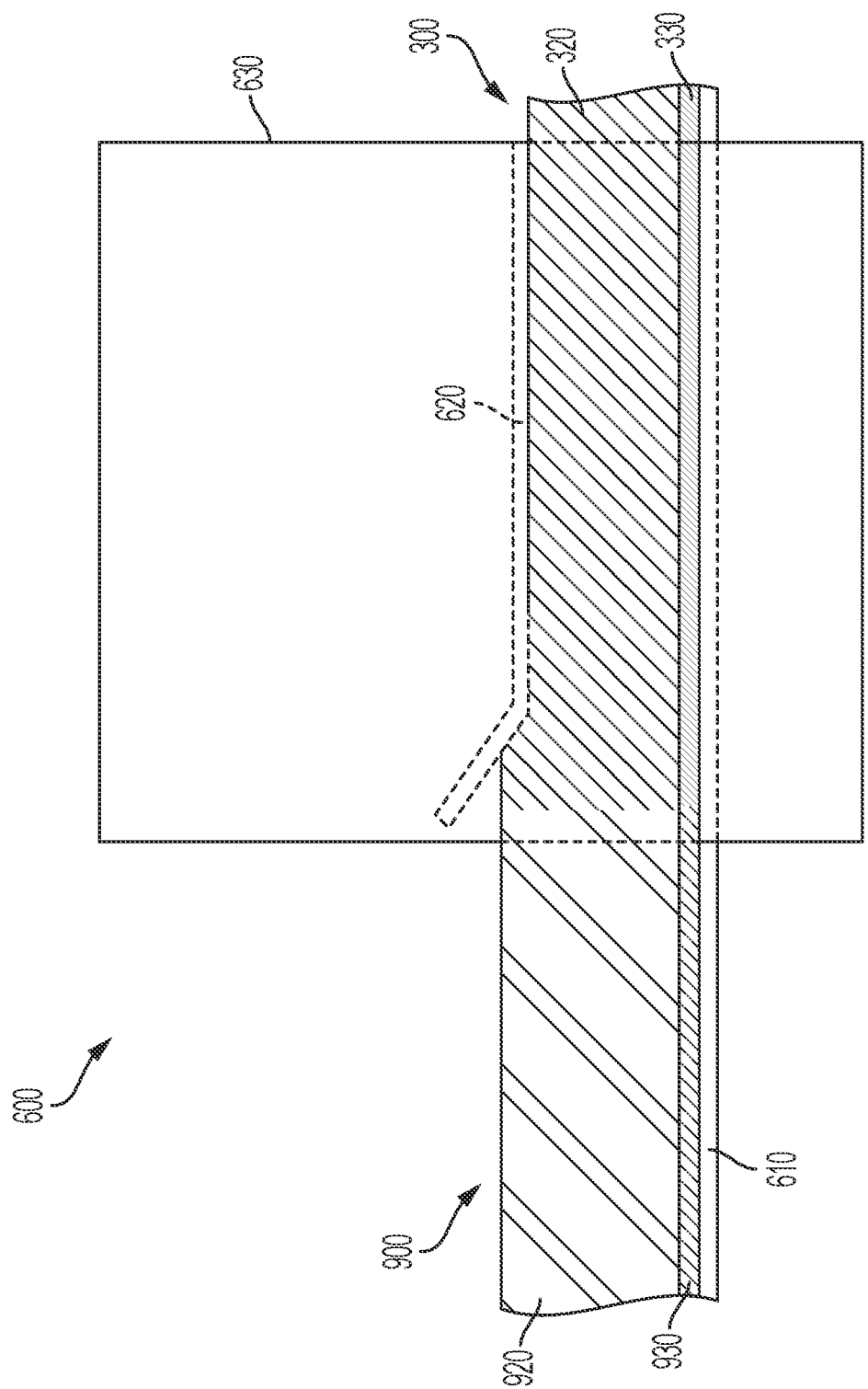
FIG. 10 depicts the formation of the insulation component of FIG. 3 with the amalgam of FIGS. 9A-B.

FIGS. 9-10 depict the formation of the insulation component 300. FIGS. 9A-B depict the formation of an amalgam 900 made of the facer substrate 930 and the core substrate 910. It is understood that features ending in like reference numerals as features discussed above are similar, except as noted below.

The core substrate 910 may be provided in a cured form and coupled to the facer substrate 930 while the facer substrate 930 is uncured to form an amalgam 900, as shown in FIG. 9B. For example, the core substrate 910 may be pressed on top of the facer substrate 930. However, in other embodiments, the facer substrate may be positioned on top of the core substrate when being pressed.

Turning to FIG. 10, the amalgam 900 may be introduced into a curing system 600, as described above, to form the insulation component 300. The amalgam 900 may be transported along the conveyor belt 610 into the curing oven 630 where the amalgam 900 is heated to a curing temperature and the binding element starts to cure.

The amalgam 900 may be compressed prior to or during the curing stage. For example, the amalgam 900 may be compressed between the conveyor belt 610 and plate 620 while the amalgam 900 is in the curing oven 630. This compresses the amalgam 900 to have less thickness than when it first made contact with the plate 620. As the facer substrate 730 is uncured while the core substrate 920 is cured, the facer substrate 930 is more malleable than the core substrate 920. As such, compressing the amalgam 900 compresses the less malleable core substrate 920 against the more malleable facer substrate 930. In other embodiments, there may be other means of compressing the amalgam 900 than as shown. However, as noted above, the facer substrate may be provided in a cured form.

Heating and compressing the amalgam 900 may cure the binding element such that the amalgam 900 cures into the insulation component 300 to have an increased density relative to the amalgam 900. Specifically, this increases the density of the facer substrate 930 as the facer substrate 930 is cured to be the facer layer 330. Where the facer substrate is provided in a cured form, the facer substrate may include no change in density from before and after entering the curing oven.

4. Forming the Fourth Exemplary Insulation Component

Figure 11A:
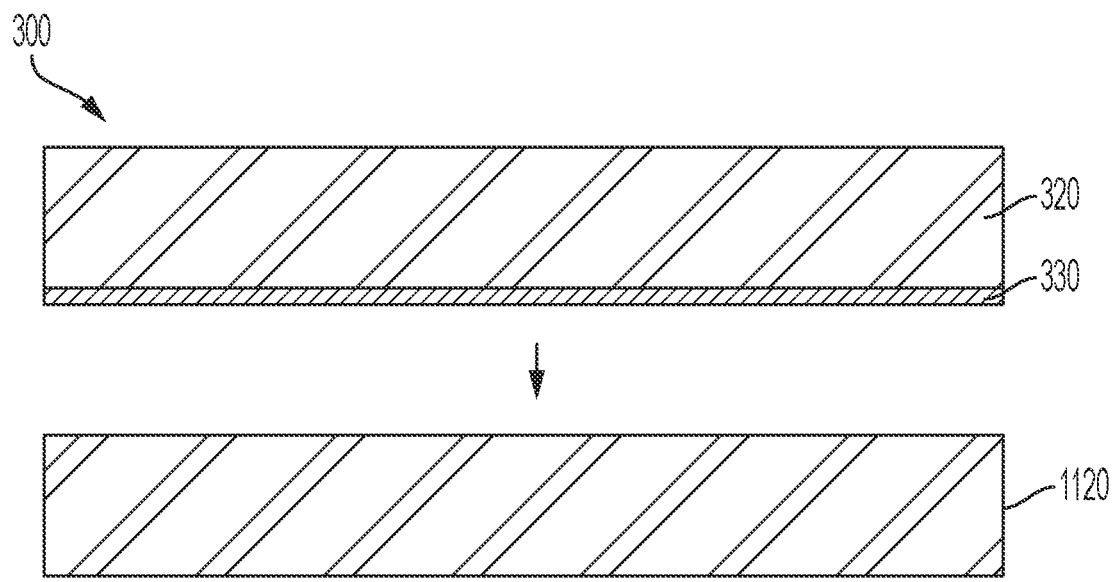
FIGS. 11A-B depict the formation of an exemplary amalgam, according to some embodiments.
Figure 11B:
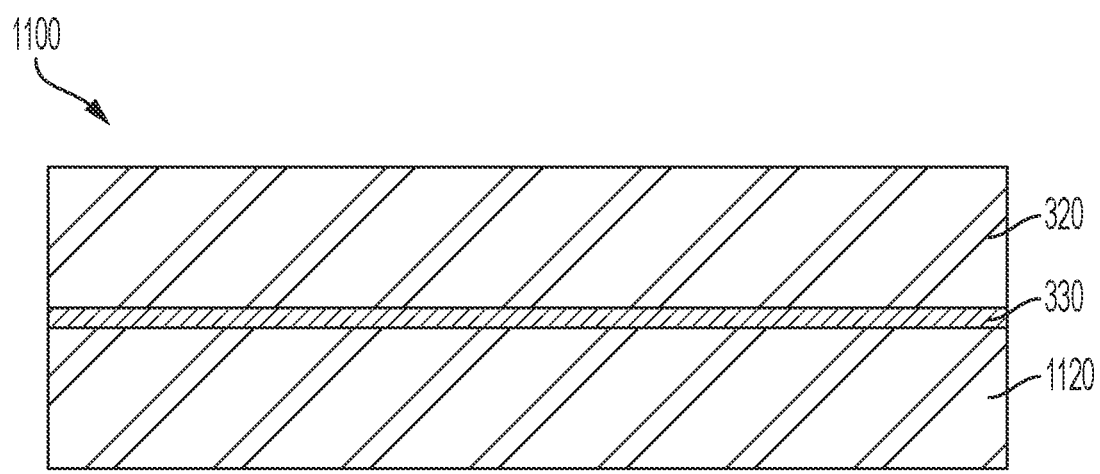
Figure 12:
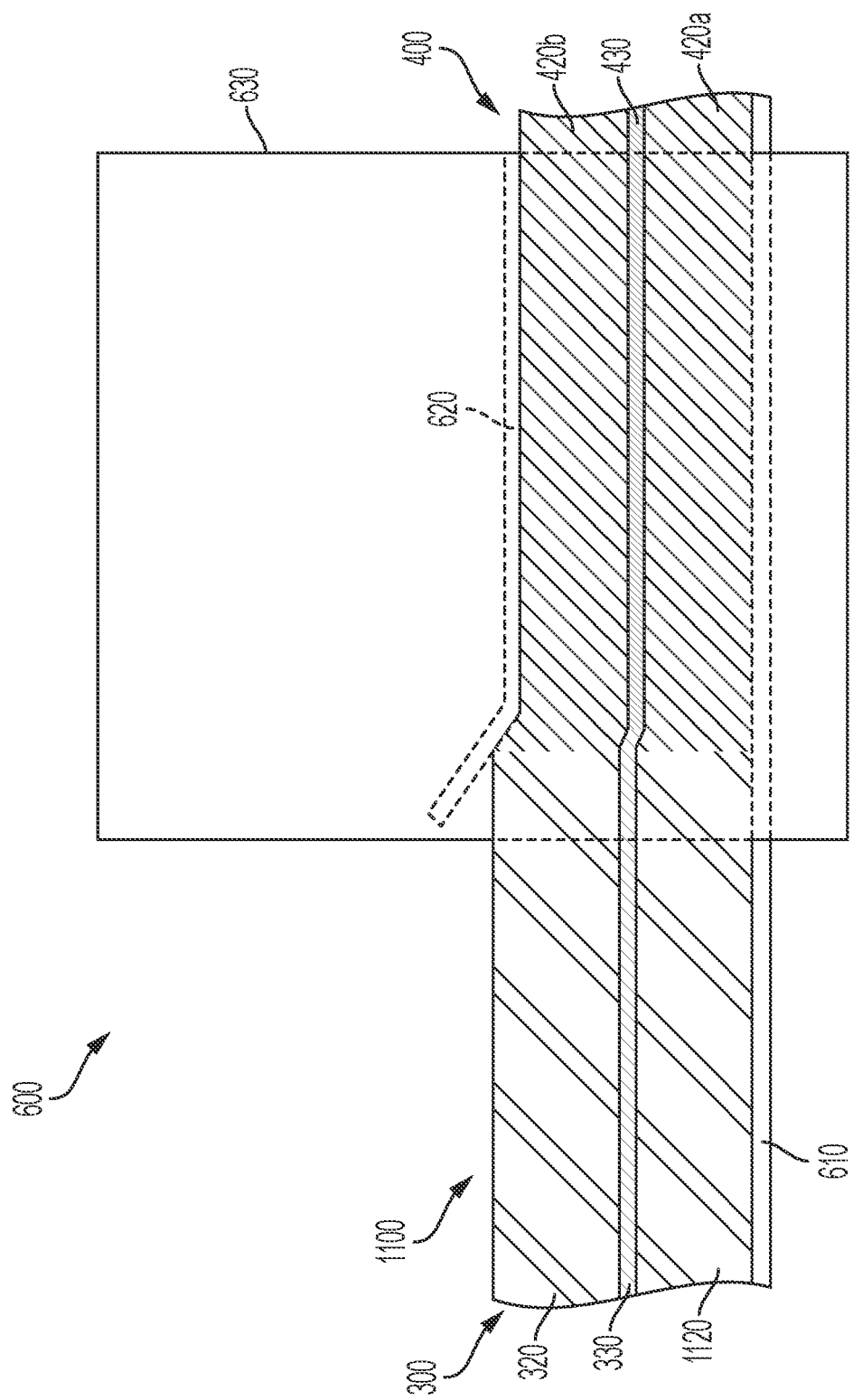
FIG. 12 depicts the formation of the insulation component of FIG. 4 with the amalgam of FIGS. 11A-B.

FIGS. 11-12 depict the formation of the insulation component 400. FIGS. 11A-B depict the formation of an amalgam 1100 made of the core substrate 1120 and the insulation component 300. It is understood that features ending in like reference numerals as features discussed above are similar, except as noted below.

The insulation component 300 may be provided in a cured form and coupled to the core substrate 1120 while the core substrate 1120 is uncured. Specifically, the facer layer 330 may be coupled to the core substrate 1120 to form an amalgam 1100, as shown in FIG. 11B. For example, the insulation component 300 may be pressed on top of the core substrate 1120. However, in other embodiments, the substrates may have any relative position when being pressed Turning to FIG. 12, the amalgam 1100 may be introduced into a curing system 600, as described above, to form the insulation component 300. The amalgam 1100 may be transported along the conveyor belt 610 into the curing oven 630 where the amalgam 1100 is heated to a curing temperature and the binding element starts to cure.

The amalgam 1100 may be compressed prior to or during the curing stage. For example, the amalgam 1100 may be compressed between the conveyor belt 610 and plate 620 while the amalgam 1100 is in the curing oven 630. This compresses the amalgam 1100 to have less thickness than when it first made contact with the plate 620. As the core substrate 1120 is uncured while the insulation component 300 is cured, the core substrate 1120 is more malleable than the insulation component 300. As such, compressing the amalgam 1100 compresses the less malleable insulation component 300 against the more malleable core substrate 1120. In other embodiments, there may be other means of compressing the amalgam 1100 than as shown.

Heating and compressing the amalgam 1100 may cure the binding element such that the amalgam 1100 cures into the insulation component 300 to have an increased density relative to the amalgam 1100. Specifically, this increases the density of the core substrate 1120 such that the core substrate 1120 is cured to be the core layer 420a.

B. Exemplary Flowchart

Figure 13:
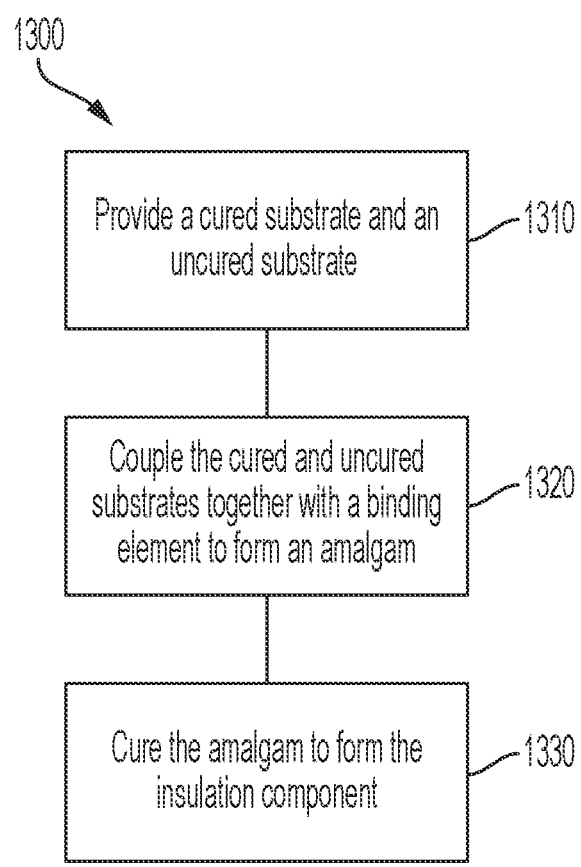
FIG. 13 depicts an exemplary flow chart, according to some embodiments.

FIG. 13 depicts an exemplary flowchart 1300 for forming an insulation component. For example, this may include forming one of the insulation components 100, 200, 300, 400.

At step 1310, a cured and uncured substrate are provided. The cured substrate may be one of the core substrates 520, 720, 920, 1120 and facer substrates 330, 730, 930. The uncured substrate may be one of the skin substrates 510, 710, facer substrates 330, 730, 930, or core substrate 1120. In some embodiments, the first and second substrates are a fiberglass material.

At step 1320, the cured and uncured substrates are coupled together with a binding element to form an amalgam. The cured and uncured substrates may be coupled together by being pressed together. The amalgam may be one of the amalgams 500, 700, 900, 1100. In some embodiments, the binding element is a cohesive binder.

At step 1330, the amalgam is cured to form the insulation component having a first layer with a first density and a second layer with a second density less than the first density. The first and second layers may comprise a similar material. The first density may provide the insulation component with enough rigidity to be self-supporting. The insulation component may include a fiber diameter less than 2 μm or a density of less than 1.5 pcf. The amalgams 500, 700, 900, 1100 may be cured in a curing system 600 to respectively form an insulation component 100, 200, 300, 400. The amalgams 500, 700, 900, 1100 may be heated and compressed in the curing oven such that the binding element is cured and the amalgams 500, 700, 900, 1100 is respectively cured into the insulation component 100, 200, 300, 400.

In another example, where the cured substrate is a first cured substrate and providing the cured and uncured substrates includes providing a second cured substrate, curing the amalgam to form the insulation component includes compressing the first cured substrate, the second cured substrate, and the uncured substrate together to increase a density of the uncured substrate. In this example, with reference to FIGS. 12-13, the first cured substrate may be the core layer 320, the second cured substrate may be the facer layer 330, and the uncured substrate may be the core substrate 1120.

Although the above disclosure has been directed towards the use of insulation components in airplanes. In other embodiments, the insulation components may be used with other vehicles, including naval vessels (e.g., submarines, boats, or the like) or train cars (e.g., high-speed rail train cars or the like).

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

The claims may be drafted to exclude any element which may be optional. As such, this statement is intended to serve as antecedent basis for use of such exclusive terminology as "solely", "only", and the like in connection with the recitation of claim elements, or the use of a "negative" limitation.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. An insulation component for use in an airplane comprising:
   a first fibrous layer having a first density and a first fiber material, wherein the first fiber material includes a first fiberglass material; and
   a second fibrous layer chemically bound to the first fibrous layer, the second fibrous layer having a second density less than the first density, wherein:
   the second fibrous layer includes a second fiber material including a second fiberglass material; and
   an average fiber diameter of the fibers in the first and second fibrous layers is less than 20 µm.

2. The insulation component of claim 1, wherein the first and second fibrous layers are cohesively bound together.

3. The insulation component of claim 1, wherein the second density provides the insulation component to have a rigidity of less than 1 inch of droop at a surface area of 22 inches by 8.5 inches.

4. The insulation component of claim 1, further comprising a third fibrous layer chemically bound to at least one of the first or second fibrous layers, the third fibrous layer having a third density different than the first and second densities.

5. The insulation component of claim 4, wherein:
   the third density is greater than the first and second densities; and
   the third fibrous layer is positioned on top of the first fibrous layer and the first fibrous layer is positioned on top of the second fibrous layer.

6. The insulation component of claim 4, wherein:
   the third density is substantially similar to the second density; and
   the third fibrous layer is positioned on top of the first fibrous layer and the first fibrous layer is positioned on top of the second fibrous layer.

7. The insulation component of claim 1, wherein the first and second fibrous layers provide the insulation component to have at least one of:
   a flame propagation resistance value of less than 2 inches of material scorched and less than 3 seconds of after flame time from being tested via radiant panel; or
   a water absorption of less than 20 g of water absorption on a sample of 10 inches by 10 inches by 4 inches or less that was submerged in water for 15 minutes.

8. An insulation component for use in an airplane comprising:
   a first fibrous layer having a first density and a first fiber material, wherein the first fiber material includes a first fiberglass material; and
   a second fibrous layer chemically bound to the first fibrous layer, the second fibrous layer having a second density different than the first density, wherein:
   the second fibrous layer includes a second fiber material including a second fiberglass material; and
   an average density of the first and second fibrous layers is less than 1.5 pcf.

9. The insulation component of claim 8, wherein the first and second fibrous layers are cohesively bound together.

10. The insulation component of claim 8, wherein the second density provides the insulation component to have a rigidity of less than 1 inch of droop at a surface area of 22 inches by 8.5 inches.

11. The insulation component of claim 8,
    wherein the first density is greater than the second density; and
    the insulation component further comprises a third fibrous layer chemically bound to at least one of the first or second fibrous layers, the third fibrous layer having a third density different than the first and second densities.

12. The insulation component of claim 11, wherein:
    the third density is greater than the first and second densities; and
    the third fibrous layer is positioned on top of the first fibrous layer and the first fibrous layer is positioned on top of the second fibrous layer.

13. The insulation component of claim 11, wherein:
    the third density is substantially similar to the second density; and
    the third fibrous layer is positioned on top of the first fibrous layer and the first fibrous layer is positioned on top of the second fibrous layer.

14. The insulation component of claim 8, wherein the first and second fibrous layers provide the insulation component to have at least one of:
    a flame propagation resistance value of less than 2 inches of material scorched and less than 3 seconds of after flame time from being tested via radiant panel; or
    a water absorption of less than 20 g of water absorption on a sample of 10 inches by 10 inches by 4 inches or less that was submerged in water for 15 minutes.

15. An insulation component comprising:
    a first fibrous layer having a first density and a first fiber material;
    a second fibrous layer chemically bound to the first fibrous layer, the second fibrous layer having a second density less than the first density; and
    a third fibrous layer chemically bound to at least one of the first or second fibrous layers, wherein:
    the third fibrous layer has a third density different than the first and second densities;
    the second fibrous layer includes a second fiber material; and
    at least one of:
       an average fiber diameter of the fibers in the first and second fibrous layers is less than 20 µm; or
       an average density of the first and second fibrous layers is less than 1.5 pcf.

16. The insulation component of claim 15, wherein the first fiber material include a first fiberglass material and the second fiber material includes a second fiberglass material.

17. The insulation component of claim 15, wherein:
    the third density is greater than the first and second densities; and the third fibrous layer is positioned on top of the first fibrous layer and the first fibrous layer is positioned on top of the second fibrous layer.

18. The insulation component of claim 15, wherein:

the third density is substantially similar to the second density; and the third fibrous layer is positioned on top of the first fibrous layer and the first fibrous layer is positioned on top of the second fibrous layer.

19. An insulation component comprising:

a first fibrous layer having a first density and a first fiber material; and a second fibrous layer chemically bound to the first fibrous layer, the second fibrous layer having a second density less than the first density, wherein:

the second fibrous layer includes a second fiber material;

the first and second fibrous layers provide the insulation component to have a flame propagation resistance value of less than 2 inches of material scorched and less than 3 seconds of after flame time from being tested via radiant panel; and at least one of:

an average fiber diameter of the fibers in the first and second fibrous layers is less than 20 μm; or an average density of the first and second fibrous layers is less than 1.5 pcf.

20. The insulation component of claim 19, wherein the first fiber material include a first fiberglass material and the second fiber material includes a second fiberglass material.

\* \* \* \* \*